(12) United States Patent
Bill

(10) Patent No.: US 12,170,895 B2
(45) Date of Patent: Dec. 17, 2024

(54) DISTRIBUTING DATA BETWEEN DEVICES

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 548 days.

(21) Appl. No.: 17/418,533

(22) PCT Filed: Jun. 16, 2020

(86) PCT No.: PCT/EP2020/066538
§ 371 (c)(1),
(2) Date: Jun. 25, 2021

(87) PCT Pub. No.: WO2020/254271
PCT Pub. Date: Dec. 24, 2020

(65) Prior Publication Data
US 2022/0124490 A1    Apr. 21, 2022

(30) Foreign Application Priority Data

Jun. 17, 2019 (GB) ..................... 1908629

(51) Int. Cl.
*H04W 12/0471* (2021.01)
*B60C 23/04* (2006.01)
(Continued)

(52) U.S. Cl.
CPC ..... *H04W 12/0471* (2021.01); *B60C 23/0462* (2013.01); *B60C 23/0479* (2013.01);
(Continued)

(58) Field of Classification Search
CPC ............ B60C 2200/02; B60C 23/0462; B60C 23/0478; B60C 23/0483; H04L 2209/80;
(Continued)

(56) References Cited

U.S. PATENT DOCUMENTS 8,880,028 B2 * 11/2014 Han .................. H04M 1/72412
455/411
9,042,817 B2 * 5/2015 Tse ....................... H04B 5/0062
455/41.1
(Continued)

FOREIGN PATENT DOCUMENTS

CN     101306637 A    11/2008
CN     107820247 A    3/2018
(Continued)

OTHER PUBLICATIONS

W. Abdallah, N. Boudriga, D. Kim and S. An, "An efficient and scalable key management mechanism for Wireless Sensor Networks," 2015 17th International Conference on Advanced Communication Technology (ICACT), 2015, pp. 480-493, doi: 10.1109/ICACT.2015.7224913. (Year: 2015).*

(Continued)

*Primary Examiner* — Michael Simitoski
(74) *Attorney, Agent, or Firm* — Nixon & Vanderhye P.C.

(57) ABSTRACT

A method of copying data from a first device to a second device, each device including a wireless communication interfaces having a maximum range, is disclosed. The first device and the second device are separated by a distance greater than the maximum range. The method includes: transmitting, by the first device, the data to a third device positioned within the maximum range of the first device; receiving the data at the third device and storing the data in a memory of the third device; moving the third device to a physical location within the maximum range of the second device; and transmitting, by the third device, the data to the second device.

15 Claims, 10 Drawing Sheets

(51) Int. Cl.
*H04L 9/08* (2006.01)
*H04W 4/02* (2018.01)
*H04W 12/63* (2021.01)

(52) U.S. Cl.
CPC .......... *H04L 9/0819* (2013.01); *H04L 9/0891* (2013.01); *H04W 4/023* (2013.01); *H04W 12/63* (2021.01); *B60C 2200/02* (2013.01)

(58) Field of Classification Search
CPC ............ H04L 9/0819; H04L 9/0891; H04W 12/0471; H04W 12/63; H04W 4/021; H04W 4/023; H04W 4/80
See application file for complete search history.

(56) References Cited

U.S. PATENT DOCUMENTS

| | | | | |
|---|---|---|---|---|
| 9,088,552 | B2* | 7/2015 | Pinder | H04W 12/04 |
| 9,716,531 | B2* | 7/2017 | Zhao | H04B 5/0031 |
| 10,460,534 | B1* | 10/2019 | Brandmaier | G08G 1/012 |
| 2007/0015463 | A1* | 1/2007 | Abel | H04W 12/35 |
| | | | | 455/41.1 |
| 2009/0131103 | A1* | 5/2009 | Liu | H04N 1/00167 |
| | | | | 455/556.1 |
| 2010/0082988 | A1* | 4/2010 | Huebner | H04L 9/0869 |
| | | | | 713/193 |
| 2010/0232607 | A1* | 9/2010 | Nimura | G06F 21/62 |
| | | | | 380/279 |
| 2012/0324218 | A1* | 12/2012 | Duren | H04L 9/0827 |
| | | | | 713/162 |
| 2013/0282231 | A1 | 10/2013 | Farr et al. | |
| 2014/0004793 | A1* | 1/2014 | Bandyopadhyay | H04W 4/80 |
| | | | | 455/41.1 |
| 2014/0099888 | A1* | 4/2014 | Flanagan | H04B 5/0031 |
| | | | | 455/41.1 |
| 2015/0339930 | A1* | 11/2015 | McCann | G08G 5/0013 |
| | | | | 701/528 |
| 2016/0267724 | A1 | 9/2016 | Liu et al. | |
| 2016/0270052 | A1* | 9/2016 | Dame | H01Q 1/521 |
| 2016/0303927 | A1 | 10/2016 | Keller et al. | |
| 2017/0195470 | A1* | 7/2017 | Li | H04B 5/0031 |
| 2017/0244712 | A1* | 8/2017 | Meredith | H04L 63/0838 |
| 2017/0282654 | A1 | 10/2017 | Guinart et al. | |
| 2017/0346623 | A1* | 11/2017 | Bill | H04L 63/045 |
| 2017/0346643 | A1* | 11/2017 | Bill | H04L 9/3271 |
| 2018/0076955 | A1* | 3/2018 | Shields | H04L 63/06 |
| 2018/0118376 | A1* | 5/2018 | Ehrstein | G07C 5/008 |
| 2018/0182491 | A1* | 6/2018 | Belliveau | G16H 40/63 |
| 2018/0337822 | A1* | 11/2018 | Heimes | H04W 4/50 |
| 2019/0184772 | A1 | 6/2019 | Bill et al. | |
| 2020/0128381 | A1 | 4/2020 | Buck et al. | |

FOREIGN PATENT DOCUMENTS

| | | | |
|---|---|---|---|
| EP | 2 910 393 | 8/2015 | |
| EP | 3249880 | 11/2017 | |
| EP | 3249880 A1 * | 11/2017 | .......... B64C 25/001 |
| GB | 2540414 A | 1/2017 | |
| GB | 2550905 A | 12/2017 | |
| TW | 200929085 | 7/2009 | |
| TW | 200929085 A | 12/2017 | |
| WO | 2018007056 | 1/2018 | |

OTHER PUBLICATIONS

R. N. Akram et al., "Challenges of security and trust in Avionics Wireless Networks," 2015 IEEE/AIAA 34th Digital Avionics Systems Conference (DASC), 2015, pp. 4B1-1-4B1-12, doi: 10.1109/DASC.2015.7311416. (Year: 2015).*
R. Di Pietro, L. V. Mancini, Yee Wei Law, S. Etalle and P. Havinga, "LKHW: a directed diffusion-based secure multicast scheme for wireless sensor networks," 2003 International Conference on Parallel Processing Workshops, 2003. Proceedings., 2003, pp. 397-406, doi: 10.1109/ICPPW.2003.1240395. (Year: 2003).*
K. Ren, W. Lou, B. Zhu and S. Jajodia, "Secure and Efficient Multicast in Wireless Sensor Networks Allowing Ad hoc Group Formation," in IEEE Transactions on Vehicular Technology, vol. 58, No. 4, pp. 2018-2029, May 2009, doi: 10.1109/TVT.2008.2003961. (Year: 2009).*
Solomon, Cristina, and Bogdan Groza. "Limon-lightweight authentication for tire pressure monitoring sensors." Security of Industrial Control Systems and Cyber Physical Systems: First Workshop, CyberICS 2015 and First Workshop, WOS-CPS 2015 Vienna, Austria, Sep. 21-22, 2015. (Year: 2015).*
Vahdat, Amin, and David Becker. "Epidemic routing for partially connected ad hoc networks." (2000): 2019. (Year: 2019).*
Zhao, Wenrui, and Mostafa H. Ammar. "Message ferrying: Proactive routing in highly-partitioned wireless ad hoc networks." The Ninth IEEE Workshop on Future Trends of Distributed Computing Systems, 2003. FTDCS 2003. Proceedings . . . IEEE, 2003. (Year: 2003).*
Saurabh, Sumit, Alwyn R. Pais, and Sumanta Chatterjee. "Efficient key management in IoT using mobile aggregator." Security in Computing and Communications: 4th International Symposium, SSCC 2016, Jaipur, India, Sep. 21-24, 2016, Proceedings 4. Springer Singapore, 2016. (Year: 2016).*
Wong, Khang-Siang, and Tat-Chee Wan. "Current state of multicast routing protocols for disruption tolerant networks: Survey and open issues." Electronics 8.2 (2019): 162. (Year: 2019).*
International Search Report for PCT/EP2020/066538, mailed Sep. 28, 2020, 4 pages.
Written Opinion of the ISA for PCT/EP2020/066538, mailed Sep. 28, 2020, 7 pages.
Translation of Chinese Office Action cited in Application No. 202080007635.8, mailed Jun. 21, 2024, 12 pages.

* cited by examiner

DISTRIBUTING DATA BETWEEN DEVICES

RELATED APPLICATION

This application is the U.S. national phase of International Application PCT/EP2020/066538 filed Jun. 16, 2020 which designated the U.S. and claims priority to United Kingdom patent application GB 1908629.7 filed Jun. 17, 2019, the entire contents of each of which are hereby incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading but can still take time due to a requirement to travel from wheel to wheel measuring the pressures.

It would be desirable to provide a tyre pressure measurement system which addresses some, or all, of these points.

SUMMARY

According to a first example, there is provided a method of copying data from a first device to a second device, each of the first and second devices comprising a wireless communication interface having a maximum range, wherein the first device and the second device are separated by a distance greater than the maximum range. The method comprises: transmitting, by the first device, the data to a third device positioned within the maximum range of the first device; receiving the data at the third device and storing the data in a memory of the third device; moving the third device to a physical location within the maximum range of the second device; and transmitting, by the third device, the data to the second device.

Optionally, the data is copied to one or more further devices, and the method comprises: for each of the one or more further devices, moving the third device to a physical location within the maximum range of the respective further device and transmitting, by the third device, the data to the respective further device using the wireless communication interface.

Optionally, the maximum range is less than 30 cm.

Optionally, the method comprises: making the data in the memory of the third device unreadable after the transmitting to the second device. The making the data unreadable may be responsive to turning off the third device. The making the data unreadable may be responsive to a determination that a predetermined period of time has elapsed since the third device received the data.

Optionally, the data comprises configuration information. The configuration data may comprise at least one of: reference tyre pressure data, a vehicle identifier, compatibility data and wheel position data. The configuration information may be received by the first device from a fourth device.

Optionally, the data comprises an encryption key. The method may comprise generating, by the first device, the encryption key after receiving configuration data from a fourth device. The method may comprise generating, by the first device, the encryption key responsive to a command received from a fourth device.

Optionally, the communication between the first device and the third device uses a first wireless communication interface and the communication between the first device and fourth device uses a second wireless communication interface, the second wireless communication interface having a greater maximum range than the first wireless communication interface.

Optionally, the method comprises providing an indication, by the fourth device, to direct the movement of the third device from the first device to the second device after the transmitting of the cryptographic key by the first device. The indication may be provided by a display of the fourth device.

In another example, a system comprises a first device, a second device and a third device each comprising a wireless communication interface and a processor, wherein the system is configured to implement the method described above. The system may further comprises a fourth device comprising a wireless communication interface and a processor, wherein the system is configured to implement the method described above with reference to features of the fourth device.

In another example a method of distributing data between a plurality of tyre monitoring devices, each tyre monitoring device comprising a wireless communication interface having a maximum transmission range, wherein the plurality of tyre monitoring devices are spaced apart from each other by greater than the maximum transmission range is provided. The method comprises, at a control device: causing data to be distributed to be transmitted by a first tyre monitoring device to an intermediary device using the wireless communication interface; directing the intermediary device to be moved within the maximum transmission range of a second wireless device; and responsive to the intermediary device having been moved within the maximum transmission range of the second tyre monitoring device, causing the data be transferred to the second tyre monitoring device from the intermediary device.

In another example, a control device for a tyre monitoring system comprises: a wireless communication interface; a display; and a processor configured to implement the method described above.

In another example, a method of distributing data between a plurality of tyre monitoring devices using an intermediary device, each of the tyre monitoring devices and the intermediary device comprising a wireless communication interface having a maximum transmission range, wherein the plurality of tyre monitoring devices are spaced apart from each other by greater than the maximum transmission range is provided. The method comprises, at an intermediary device: receiving, at the intermediary device, data from a first tyre monitoring device using a wireless communication interface; storing, by the intermediary device, the data in a memory of the intermediary device; moving the intermediary device to within the maximum transmission range of a second tyre monitoring device; transmitting, by the intermediary device, the data to the second tyre monitoring device; and after the transmitting the data to the second tyre monitoring device, erasing the data from the memory of the intermediary device.

In another example there is provided an intermediary device for a tyre monitoring system. The intermediary device comprises: a wireless communication interface; and a processor configured to implement the method as described above.

In a further example. a method of distributing cryptographic keys from a first device to a second device is provided. The method comprises: transmitting, by the first device, a cryptographic key for communication between the first device and the second device to a third device using a wireless communication interface having a transmission range less than 30 cm; receiving the cryptographic key at the third device and storing the cryptographic key in a memory of the third device; transmitting, by the third device, the cryptographic key to the second device using a wireless communication interface having a transmission range of less than 30 cm; and erasing, by the third device, the cryptographic key from the memory of the third device after the transmitting to the second device.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth.

Reference in the specification to "an example" or similar language means that a particular feature, structure, or characteristic described in connection with the example is included in at least that one example, but not necessarily in other examples.

Certain methods and systems described herein relate to the operation of a sensor network in an aircraft, such as a network of tyre monitoring devices. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, data distribution can be carried out using a relatively short range wireless communication interface. Two devices are separated by a distance greater than the wireless communication range of the wireless communication interface and data is transferred between them using a third, intermediary device. Security is improved because the short range makes it difficult for communications to be intercepted. This is beneficial for sensitive data, such as configuration data and encryption keys.

Figure 1:
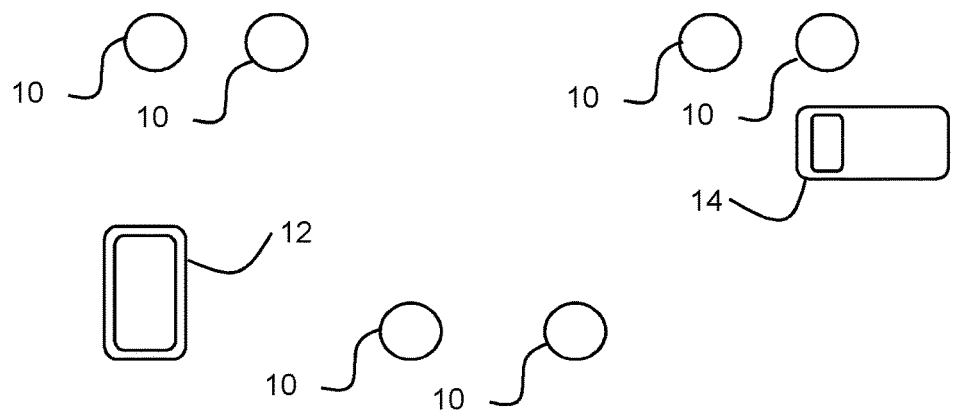
FIG. 1 shows a schematic representation of a tyre monitoring system according to a first example of the invention.

According to other examples herein, a configuration device has two different visual indicators that can be seen from different viewing angles. The different indicators improve visibility of an indication when the configuration device is positioned so that it may be difficult to observe, such as in close proximity to a tyre monitoring device, Example Tyre Monitoring System FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
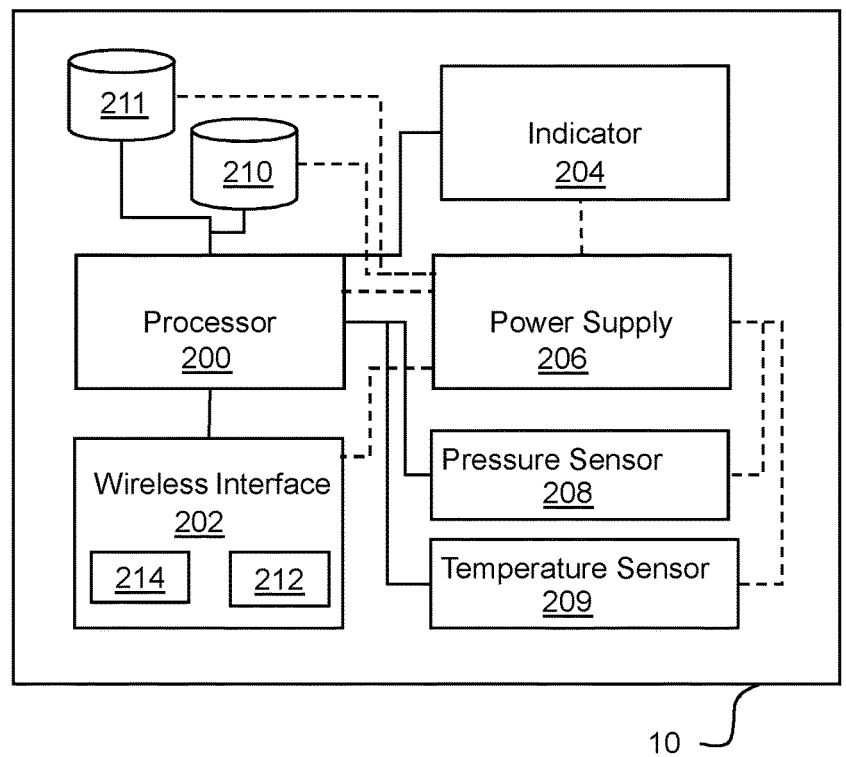
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
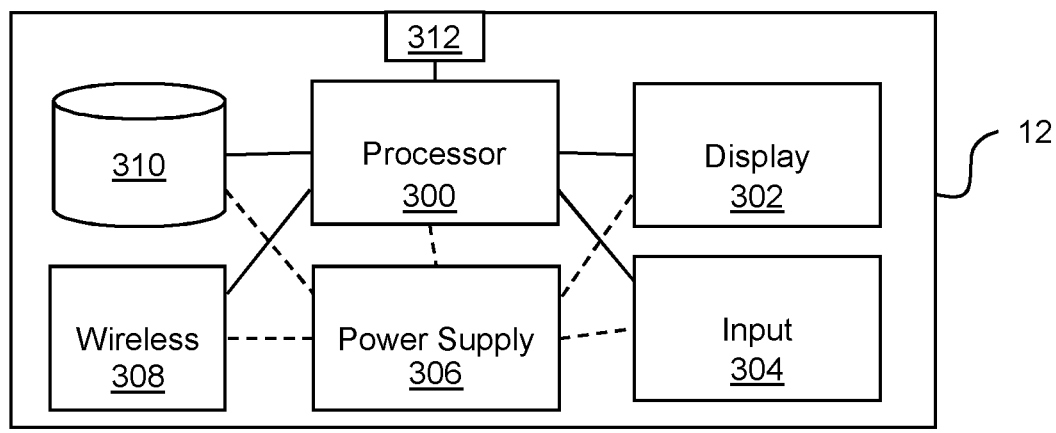
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
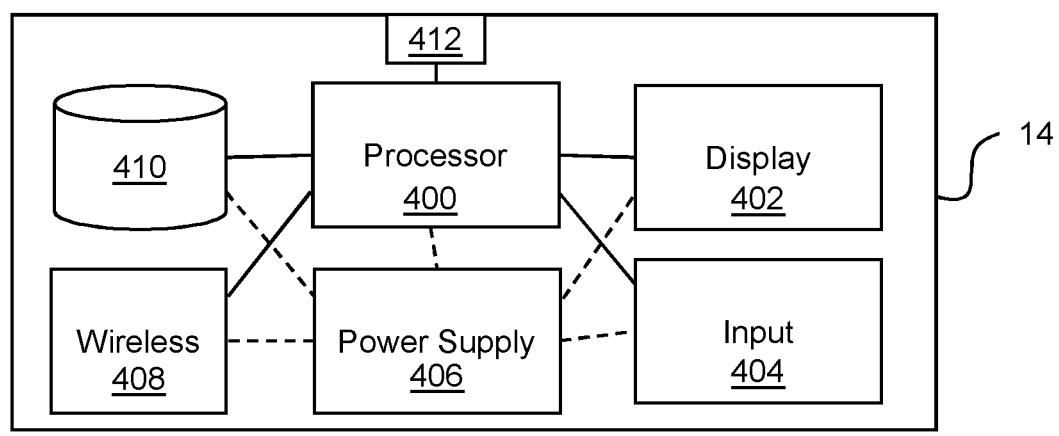
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
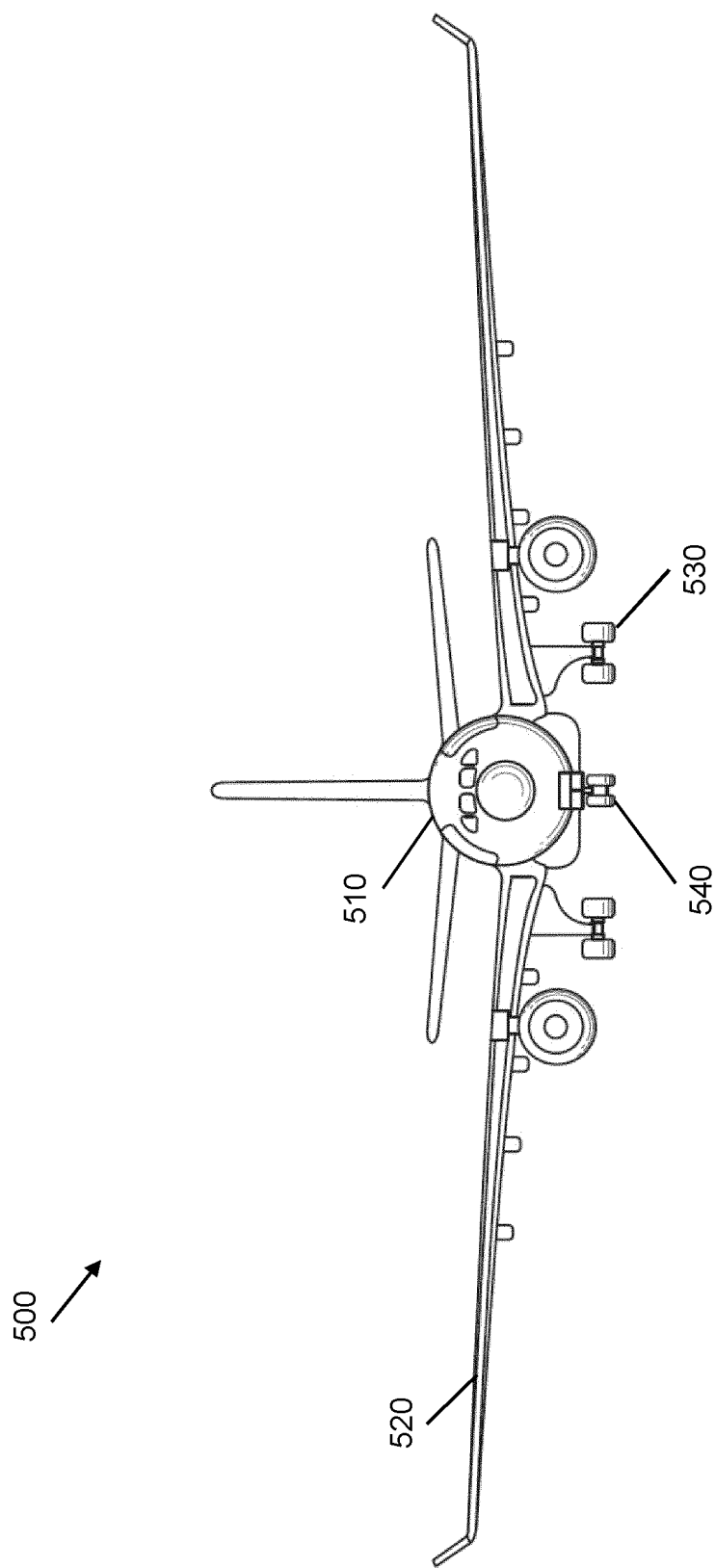
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
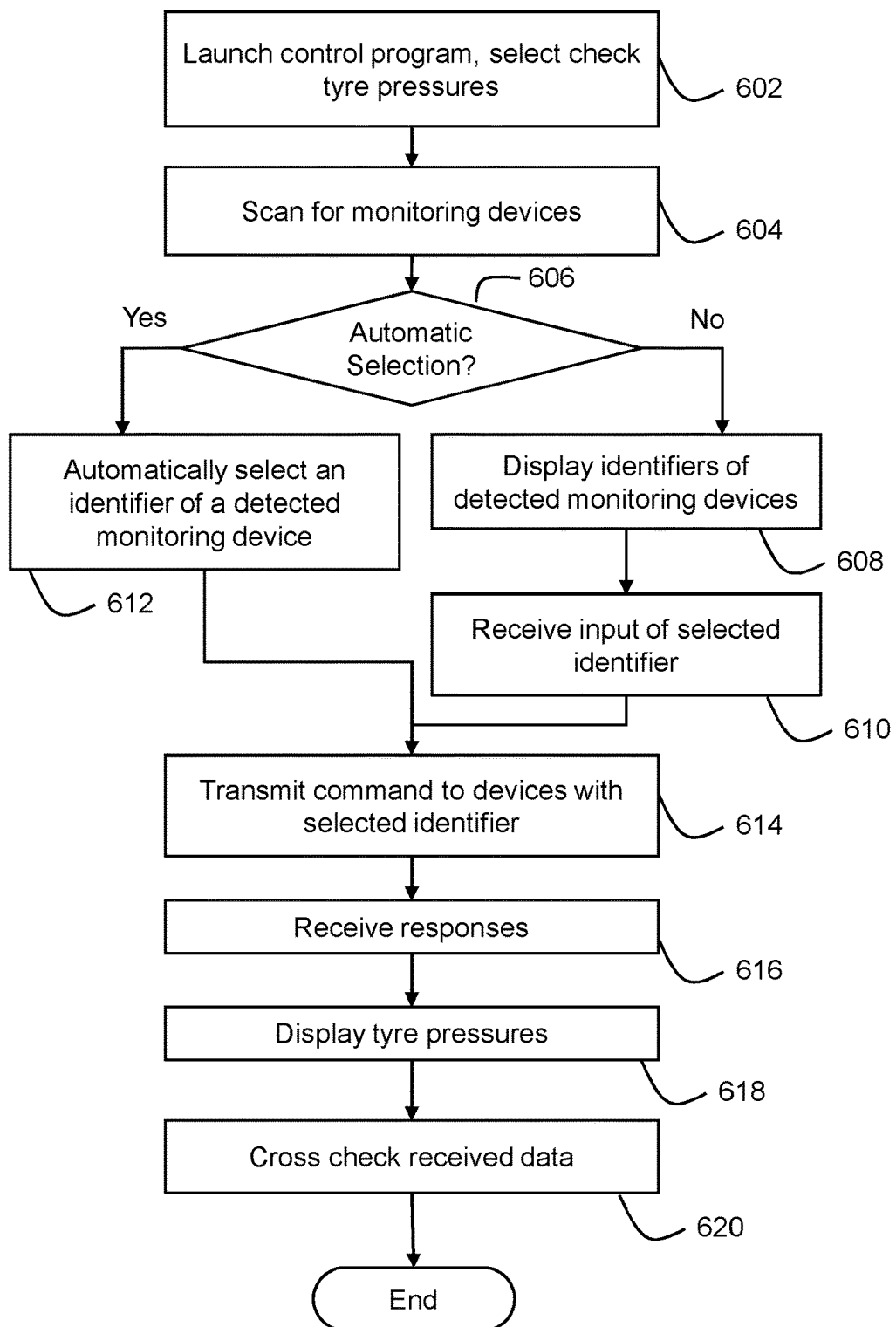
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
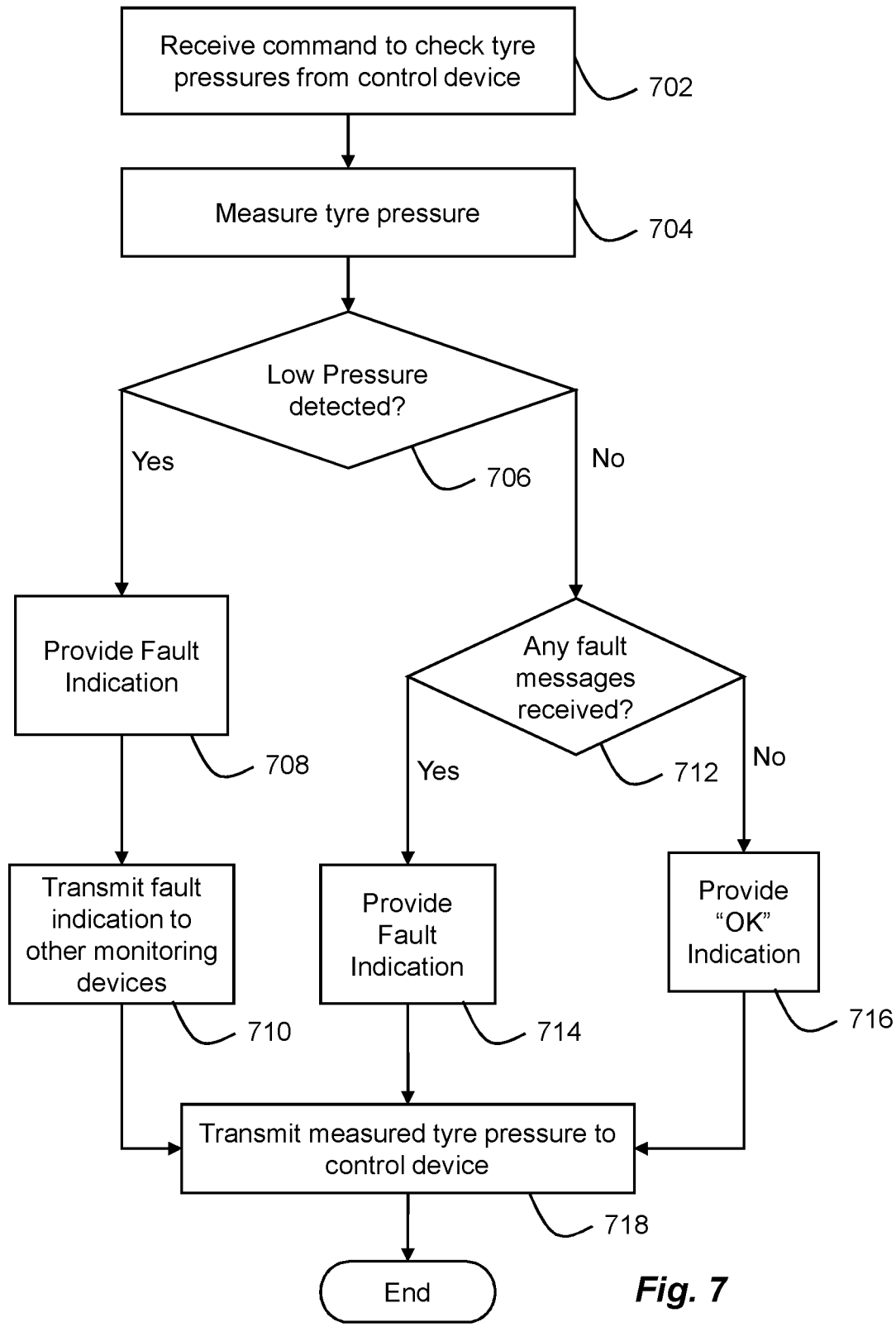
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Controlling the Flow of Configuration Instructions

Figure 8:
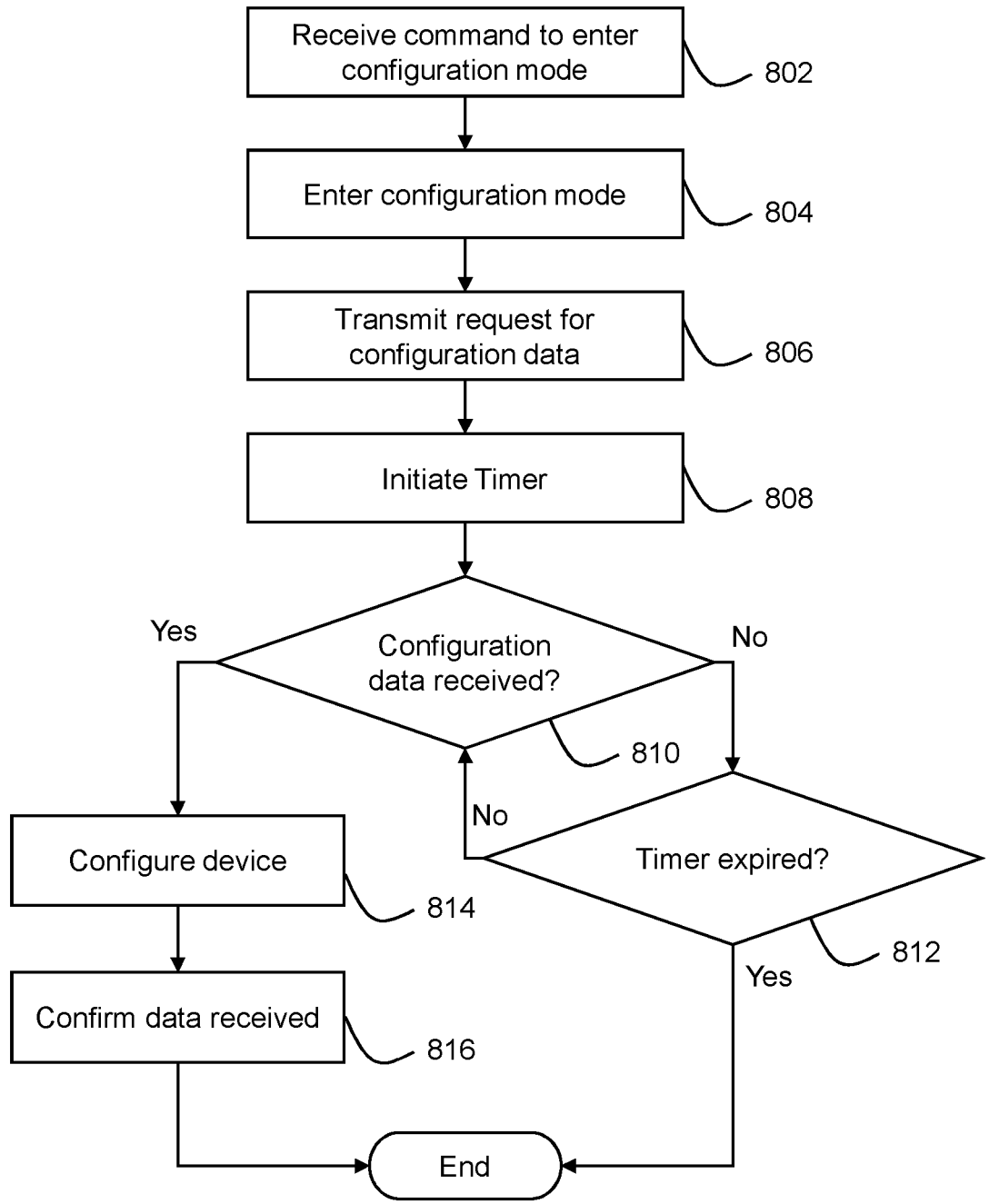
FIG. 8 shows a flow chart of a process by which a tyre monitoring device controls the flow of configuration data that can be used by the tyre monitoring device of FIG. 2.

Referring now to FIG. 8, a method of configuring a tyre monitoring device, such as the tyre monitoring device of FIG. 2, is disclosed. In this method, the tyre monitoring device itself controls the flow of configuration data. This provides increased security because the time window for a malicious device to inject incorrect configuration data is shorter.

The method begins at block 802, where the tyre monitoring device receives a command to enter the configuration mode. In this example, the command is received from the configuration device using a short range communication protocol, for example a protocol with a transmission range of 30 cm or less, such as NFC. This limits the potential for the tyre monitoring device to enter the configuration mode because the command must be provided in close proximity, making a malicious or accidental reconfiguration less likely. In addition, the short range allows tyre monitoring devices affixed to adjacent wheels on the same axle to be distinguished because only one is in range of the configuration device. In other examples, the command to enter the configuration mode may be sent by another device, such as the control device. If the command to enter the configuration mode is sent by the control device, it may be sent over a short range communication protocol, such as NFC, in the same way as for the configuration device. Alternatively a longer range communication protocol, such as one conforming to IEEE 802.11 or IEEE 802.15 standards may be used, although shorter ranges may provide more security.

In other examples, the command to enter the configuration mode can be provided in other ways, such as by pressing a button provided on the tyre monitoring device itself, although this may be less secure. The button may be physical button which moves to register an input or a capacitive or resistive button which in a change in capacitance or resistance is detected to register an input.

At block 804, the tyre monitoring device enters the configuration mode. Although entry into the configuration mode requires receipt of an external command, the configuration or reconfiguration in the remaining blocks of the method is controlled by the tyre monitoring device itself. Thus, at block 806, the tyre monitoring device transmits a request for configuration data to a second device. The request indicates that the second device should transmit configuration data to the tyre monitoring device. The second device can be either the control device of FIG. 3 or the configuration device of FIG. 4. Which particular second device is used may depend upon the particular circumstances, for example the control device may provide general configuration data such as reference tyre pressures, while the configuration device may provide more security sensitive data, such as encryption keys for communication with others of the tyre monitoring devices. In other examples all configuration data may be provided by the same device.

After having sent the request for configuration data, the tyre monitoring device awaits receipt of a response. In this example, a timer is initiated at block 808 which defines a timeout period after which the tyre configuration device will exit the configuration mode. The timer may be set for any suitable predetermined time, such as 0.5 seconds, 1 second, 5 seconds, 10 seconds, 20 seconds, 30 seconds or one minute depending on the trade-off between reliable receipt of the configuration data and minimizing the window for potential malicious or accidental reconfiguration.

At block 810, the tyre monitoring device checks to see if any configuration data has been received. If it has not, execution proceeds to block 812, otherwise, when data has been received, execution proceeds to block 814.

At block 812, no configuration data has yet been received. It is checked whether the timer initiated in block 808 has expired, if it has execution ends. Otherwise execution returns to block 810 to check whether configuration data has been received.

At block 814, the received configuration data is processed and used to configure the device. For example, the configuration data may comprise one or more of: a reference tyre pressure (a reference tyre pressure can be specified differently for different wheels, such as a different reference pressure for nose landing gear and main landing gear on a typical six-wheeled aircraft); a wheel position of the tyre monitoring device, such as a numerical or an alphanumeric identifier enabling the position of the wheel to be determined; a vehicle identifier, such as an aircraft tail identifier; and compatibility data, such as data indicating a software version for compatibility with the configuration data.

While the method of FIG. 8 illustrates a single request for configuration data in block 806 and a single response with configuration data which is processed in block 814, in other examples multiple requests and responses may take place. For example, the tyre monitoring device may request each item of configuration data separately, or may request different items of configuration data from different devices in multiple transactions or in a single transaction with each different device.

Once the tyre monitoring device is configured, the tyre monitoring device provides confirmation to the second device that the configuration data has been received in block 816. This may be, for example, an acknowledgement of the configuration data or a confirmation that the configuration mode has ended. Execution then ends.

Once execution of the method of FIG. 8 has ended, the tyre monitoring device may disregard, discard or take no action in response to any configuration data received. This can enhance security and guard against malicious or accidental reconfiguration because the tyre monitoring device cannot be reconfigured unless it is in the configuration mode.

The method of FIG. 8 enables a tyre monitoring system to operate with enhanced security against misconfiguration, either accidental or malicious. The tyre monitoring device may enter a configuration mode in response to a received command, but configuration data itself is only processed in response to a request sent by the time monitoring device after it has entered into the configuration mode. In this way the security is increased because the window for receipt of configuration data is small.

In some examples, the tyre monitoring device may reject configuration data which is not received in response to a request for configuration data sent by the tyre monitoring device itself, even when the tyre monitoring device is in the configuration mode. For example, configuration data may only be accepted from a device which was requested to provide configuration data and not from other devices. This may further enhance security.

Distributing Data Between Devices

Figure 9:
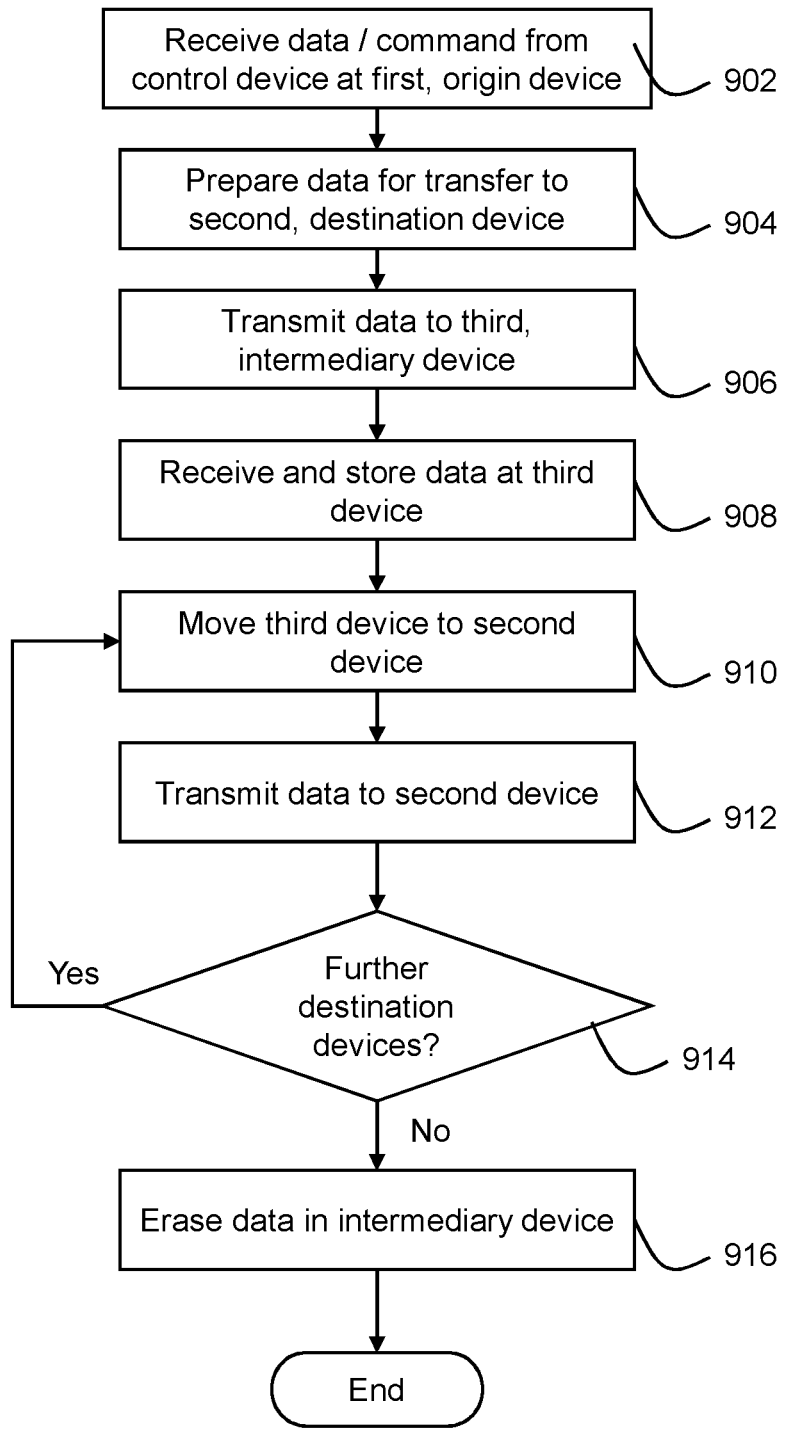
FIG. 9 shows a flow chart of an example data distribution process that can be used by the tyre monitoring system of FIG. 1.

FIG. 9 depicts a method of distributing data between devices that can be used by the tyre monitoring system of FIG. 1. In this method, data is transferred using short range wireless communication, for example having a maximum transmission range of 30 cm or less. Other examples may have a maximum transmission range of 20 cm, 10 cm, 5 cm, 1 cm, or less. This provides enhanced security for important or sensitive data because the data cannot be intercepted as easily, requiring close physical proximity to do so. However, it also presents challenges because the short range of communication makes direct device to device communication difficult, particularly when none of the individual tyre monitoring devices are with the maximum communication range of each other. In the method of FIG. 9, an intermediary device is used to transfer the data from a first or origin device to a second or destination device. The origin and destination devices can both be tyre monitoring devices, for example. The method of FIG. 9 is useful for tyre monitoring devices which have been installed on wheels because after installation they cannot easily be moved relative to each other to a position closer than, for example 30 cm from each other, to enable direct short range communication to be used. While longer range communication could be used for communication between devices, this is less secure when the data to be transmitted is important or sensitive, such as encryption keys which could be intercepted.

At block 902 a first or origin device receives data or a command from a fourth or control device. In this example, the origin device is a tyre monitoring device as discussed above with reference to FIG. 2 and the control device is a control device as discussed above with reference to FIG. 3. The command or instruction causes the first device to prepare data for transfer to a destination device at block 904. The nature of this data depends on the nature of the command, data or instruction received at block 902. For example, it may be configuration data for transfer to another device, such as reference tyre pressures, vehicle identifiers and so on. It may also be security data, such as an encryption key used to encrypt communication between tyre monitoring devices in the system. For example, the command from the fourth device may cause the first device generate a shared encryption key for use by the tyre monitoring devices to encrypt communications between themselves using a symmetrical encryption algorithm, such as AES.

At block 906, the first device transmits the data to a third or intermediary device. In this example, the third device is a configuration device as described above with reference to FIG. 4. The first device establishes communication over a short range wireless communication interface with the third device, such as Near Field Communication (NFC or RFID). For example the wireless communication interface may have a range of 30 cm, 20 cm, 10 cm, 5 cm, 1 cm, or less.

The third device receives and stores the data transmitted by the first device at block 908. The data can be stored in any suitable storage, including volatile and non volatile storage such as dynamic RAM or solid state storage.

Next, at block 910, the third device is moved to the second, destination device which is to receive the data. In this example the third device is carried by a user, who may be directed to move third device to a position close to the second device.

The third device can determine that it is in position near the second device by successfully establishing wireless communication with the second device using the short range wireless communication protocol. It then receives a request from the second device to transfer the data and responsively transmits the data at block 912. The data has now been transmitted to the second device. At block 914, a check is carried out whether there are any further destination devices. For example, the same data may require distribution to all of the tyre monitoring devices in the tyre monitoring system. In that case, the third device is moved between those further devices as required, repeating steps 910 and 912 until there are no further devices to distribute the data to.

Where it is determined at block 914 that there are no further destination devices, execution proceeds to block 916, where the third device erases the data held in its storage. This may be carried out in any suitable way, in general by rendering or making the stored data unreadable. For example, a volatile memory may cease to be refreshed, a non-volatile memory may be securely erased, such as by overwriting or changing an encryption key for the storage, or the data may be marked as deleted, removed from a file allocation table or otherwise made inaccessible. The precise way in which the data is deleted will depend on the level of security required. For example encryption keys may be erased by overwriting with new data several times or by changing an encryption key or for the storage where the encryption key was stored. Less sensitive data, such as tyre reference pressures may simply be marked as deleted. The process then ends.

In this example, erasing the data in block 916 follows a determination that there are no further destination devices at block 914. In other examples, the data may be made unreadable responsive to turning off the third device, which might inherently erase data in volatile memory such as dynamic RAM, for example. In further example, the data may alternatively or additionally be made unreadable or responsive to a timeout period being reached, such as 15 minutes, 10 minutes or 5 minutes. This can ensure that important or sensitive data does not remain in the storage for long to minimise the risk of it being extracted.

According to the method of FIG. 9, a third device functions as an intermediary to transfer data between a first and a second device using short range wireless communication protocols which do not allow direct communication between the first and the second device. Unlike conventional wireless transmission, the third device is physically moved between the first and the second devices. Data is not routed via intervening devices within wireless communication range of each other. This further enhances security because the risk of any intervening devices leaking the data is reduced. The method of FIG. 9 also allows a fourth or control device to coordinate transfer of data without itself learning the data transferred, which may provide additional security for encryption keys: the encryption key will be known only to the devices which need to use it and third device, with the third device deleting the encryption key once it is transferred to all devices. This is useful when it is desired for the control device to be a standard computing device, such as a smartphone or tablet, so that security cannot be guaranteed.

Figure 10:
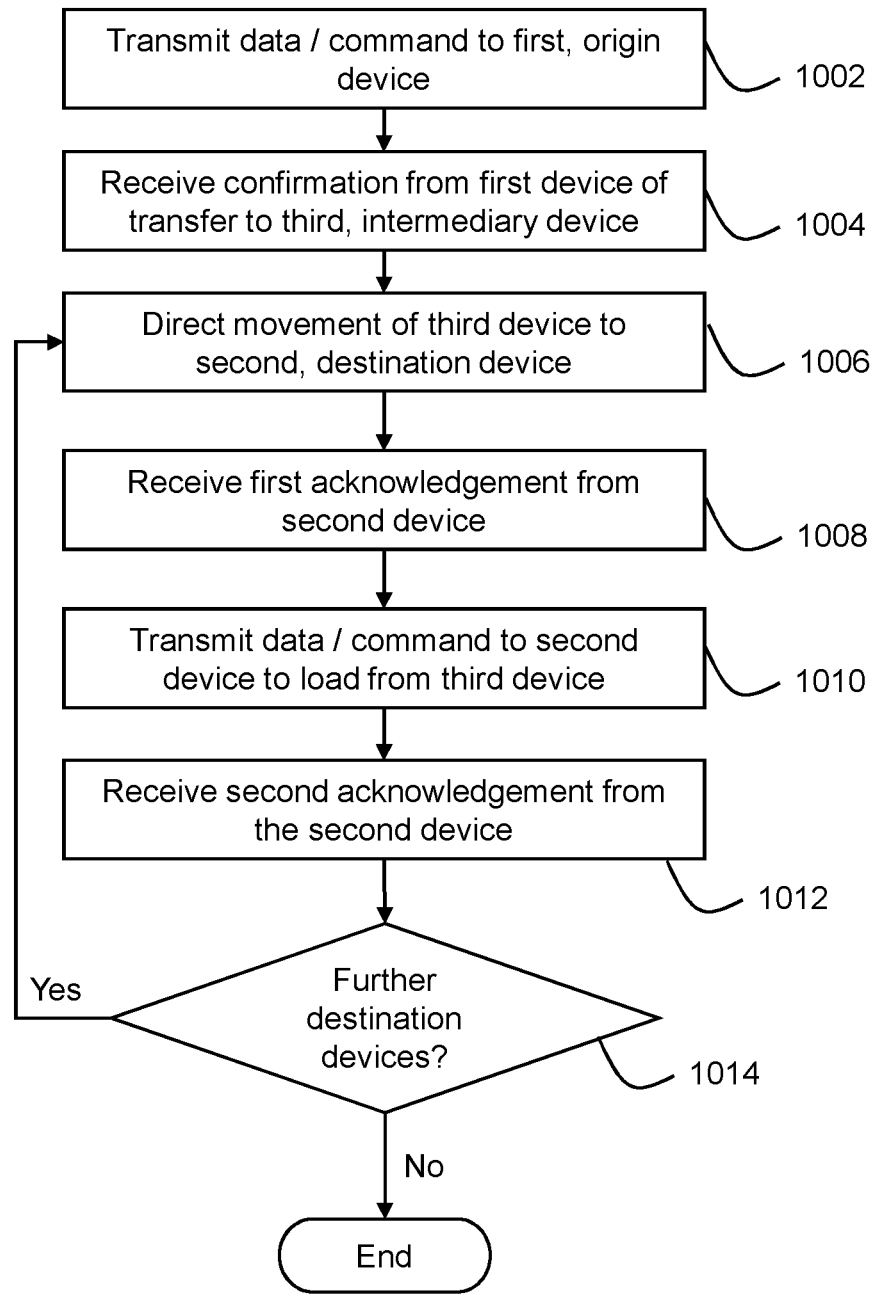
FIG. 10 shows a flow chart of a process that can be used by a control device in the data distribution process of FIG. 9.

Referring now to FIG. 10, a method which can be carried out by a fourth or control device to implement the method of FIG. 9 discussed above is shown. In the method of FIG. 10, the control device can direct the transfer of data from one device to another without itself needing to learn that data. This can enhance security, particularly of sensitive data such as encryption keys.

First, at block 1002, the fourth device transmits data and/or a command to a first or origin device. For example, the first device can be a tyre monitoring device as discussed above with reference to FIG. 2. This command can be transmitted using a wireless communication interface having a relatively long transmission range, for example 100 m. The transmission of the data or command from the fourth device to the first device may be controlled by the tyre monitoring device, as discussed above with reference to FIG. 8. The data or command causes the first device to prepare data for transmission to a third or intermediary device and transmit data to that third device, using a short range wireless communication interface as discussed above with reference to blocks 904 and 906 of FIG. 9. Once the transfer to the third device is complete, the first device sends confirmation to the fourth device using a long range wireless communication interface. This confirmation is received by the fourth device at block 1004.

Next, at block 1006, the fourth device directs the movement of the third device to the second or destination device. Directing the movement can happen in several ways. In this example, the control device displays text which directs a user to move the third device close to the second device. In other examples, directing the movement could be via an audio instruction alternatively or additionally to a displayed instruction. Where there are several possible destination devices, the control device may present options on a display for a user to select which destination device they will move the third device to. In other examples, the control device may select the destination device automatically without user input and direct the user to move the third device into proximity of that selected device.

Once the user has moved the third device into proximity of the second or destination device, short range wireless communication will be established between the second device and the third device. As a result of establishing this communication, the second device sends an acknowledgement to the fourth or control device, using long range wireless communication, which is received at block 1008. Next, responsive to receipt of this acknowledgement, the control device transmits a command or data to the second device which causes the second device to load data held in the third device. This command then causes the third device to transfer data to the second device at block 1010. When this transfer is complete, confirmation is sent by the second device to the control device using the long range communication interface, which is received at block 1012.

Next, at block 1014 it is determined whether there are any further destination devices. If there are, execution returns to block 1006 to direct the movement of the third device to the next destination device. Otherwise, execution ends.

Figure 11:
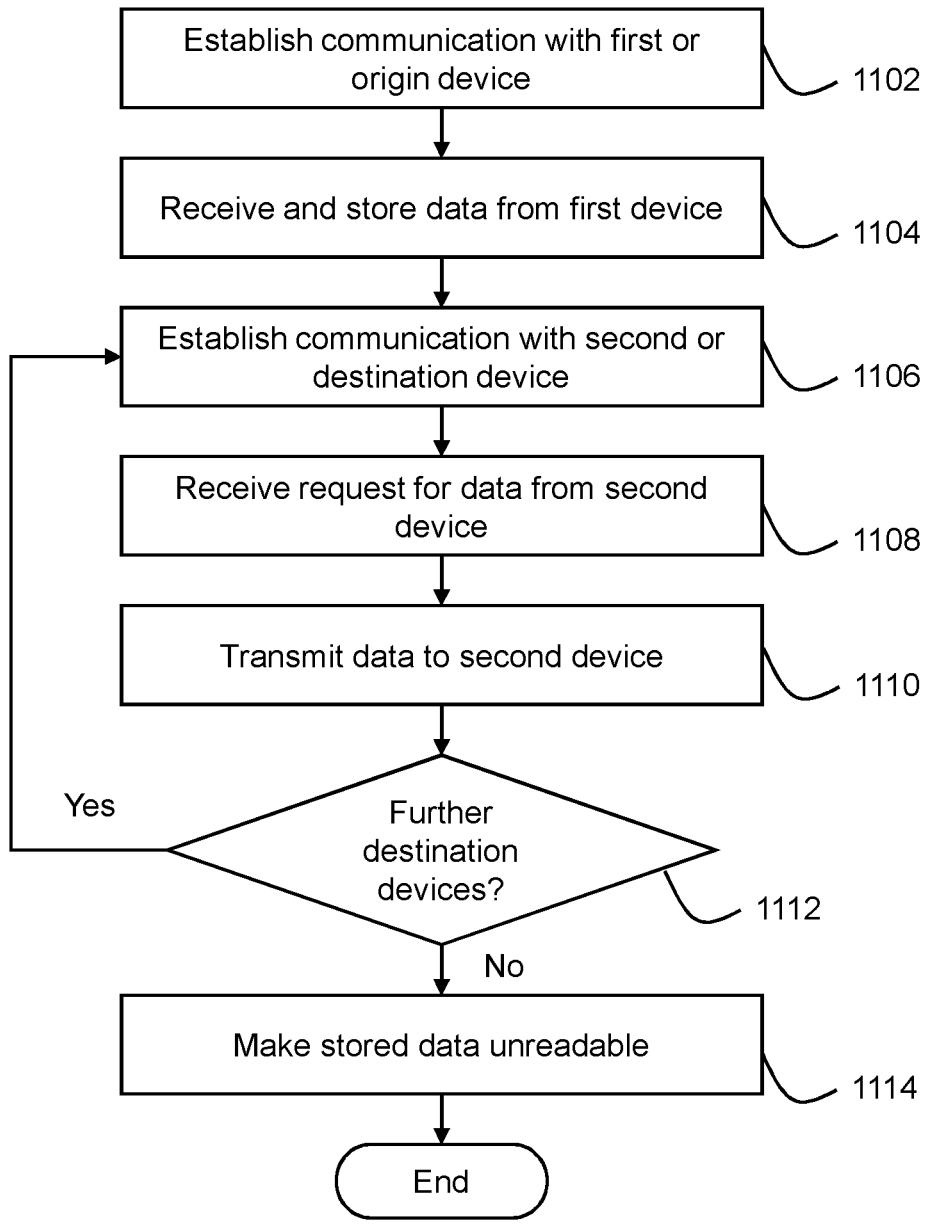
FIG. 11 shows a flow chart of a process that can be used by a configuration device in the data distribution process of FIG. 9.

Referring now to FIG. 11, a flow chart of a process for a third or intermediary device which can be used in the process of FIG. 9 is shown. In this example, the third device is a configuration device as discussed above with reference to FIG. 4.

First, at block 1102, the third or intermediary device establishes communication with a first or origin device. This communication is established over a short range wireless communication interface as discussed above with reference to FIG. 9. Having established this wireless communication, the third device receives and stores data from the first device at block 1104. The data may be stored in volatile or non-volatile storage.

The third device now waits for it to have been moved to a new location close to a second or destination device. Movement of the third device to the new location is determined when short range wireless communication is established with the second device at block 1106. Next, at block 1108, the third device receives a request for data from the second device. In response, the third device transfers the data the second device at block 1110. Data transfer from the first device to the second device is now complete.

At block 1112, it is determined whether there are further destination devices to which the data should be transferred. If there are, then the process returns to block 1106, where communication is established with another destination device when the third device has been moved within short range wireless communication range of that device. Otherwise, the process continues to block 1114. In some examples, block 1112 may not positively determine whether there are further destination devices, instead a timeout may be implemented. For example, the third device may conclude that there are no further destination devices when a preset period of time elapses without communication with another destination device being established. The preset period may be, for example, 5 minutes, 4 minutes, 3 minutes, 2 minutes, 1 minute or 30 seconds.

At block 1114, there are no more devices to transfer the data to, so the third device makes the data stored in its storage unreadable. For example, the data may be deleted can be erased or made unreadable in any suitable way, such as discussed above with reference to block 916 of FIG. 9. The process then ends.

Improving Visibility of Indications on a Configuration Device

Figure 12:
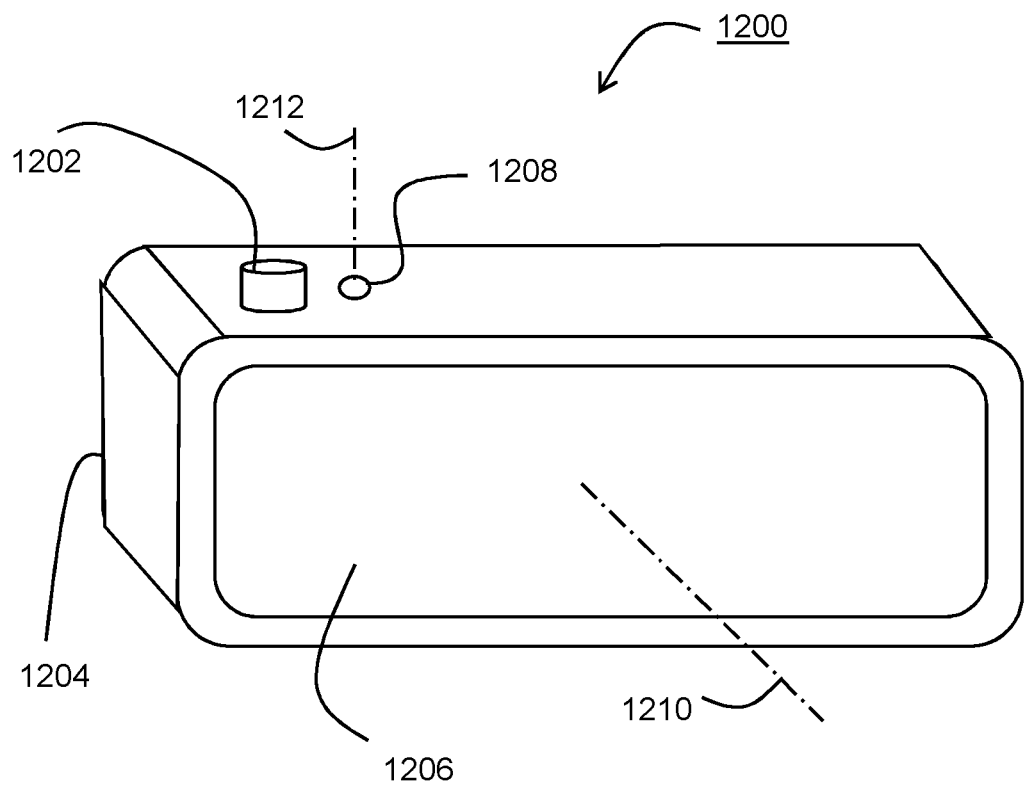
FIG. 12 is a diagrammatic representation of a configuration device having multiple indicators according to an example.

When carrying out the process of FIG. 9, a configuration device as described above with reference to FIG. 4 functions as the third or intermediary device and is moved between tyre monitoring devices to transfer data between them. By their nature, tyre monitoring devices may be located in relatively inaccessible positions, for example close to the ground or at least partially obscured from view depending on a wheel rotational position. FIG. 12 depicts an example of a configuration device 1200 which includes two visual indicators so that at least one visual indicator can be viewed in most orientations of the device. This enhances usability when the configuration device is used in inaccessible positions.

The configuration device 1200 comprises a button 1202 which is used to power on the device. In some examples, button 1202 can toggle between a power off and a power on state. The configuration device may also power off automatically from the power on state after a predetermined period of time such as 5, 10 or 15 minutes. When the configuration device moves into the power off state, any sensitive data, such as encryption keys and configuration data for transfer to tyre monitoring devices, may be deleted or otherwise rendered unreadable or inaccessible.

A housing 1204 is provided with a first visual indicator 1206 having a primary viewing direction 1210 and a second visual indicator 1208 having a different primary viewing direction 1212.

The first visual indicator 1206 is a screen, such as an LCD or LED display. The screen may provide messages or other information to a user, for example indicating the current purpose of the configuration device such as "transferring security keys—do not move" or provide a visual indication of the data to be transferred, such as the numerical values of reference pressures to be transferred and a position identifier of the wheel to which the tyre monitoring device is attached. In other examples, the current measurements from the tyre monitoring device are indicated, such as a current measured pressure and temperature. The first visual indicator 1206 is provided on a first side of the housing. Depending on the position of the tyre monitoring device, this visual indicator 1206 may not always be visible because the short range of the wireless communication interface (30 cm or less) means that the configuration device must be located close to the tyre monitoring device. To improve the likelihood of a user being able to observe a visual indication, a second visual indicator 1208 is provided on a different side of the tyre monitoring device. The second visual indicator 1208 has a different viewing angle and may be visible when the first visual indicator 1206 is not.

The second visual indicator 1208 is a light, such as an LED. The second visual indicator may indicate status—such as data transfer in process, do not move, and so on—through one or more of different colours, different intensity and different flashing patterns. To assist interpretation of these, a legend or explanation may be provided on the side of the configuration device, adjacent the second visual indicator 1208 so that it can usually be seen at the same time as the second visual indicator 1208.

By providing two visual indicators with different angles of view, the user of the configuration device can determine feedback from the indicators more easily, even when one of them is obscured. This can be beneficial when the configuration device is used to transfer data as discussed above with reference to FIGS. 9 to 11. In that case, the two indicators may be important to direct the user to maintain the configuration device in contact with the tyre monitoring device so that data transfer can take place.

While two visual indicators have been described with reference to FIG. 12, other configuration devices may include more visual indicators, for example additional visual indicators on further sides of the housing 1204 or in different positions on the same side of the housing as other visual indicators.

While the example of FIG. 12 has one visual indicator which is a display and one visual indicator which is a light, other examples may have two screens or two lights. When there are more than two visual indicators any combination of lights and screens can be provided.

Further examples may provide an indicator with an articulated screen, which can be adjusted to a position where it can be viewed by a user. For example the screen may have an articulation mechanism with one degree of freedom, such as rotation about one axis, or two degrees of freedom, such as rotation about two perpendicular axes. Such and articulated screen could be used as the first visual indication 1206. Other examples may provide an articulated screen as a single visual indicator with improved visibility being achieved by the range of movement to different viewing angles by the articulated screen.

Further examples are defined in the following clauses:

Feature 1: A configuration device for a tyre monitoring system comprising:
   a wireless communication interface;
   a first visual indicator; and
   a second visual indicator positioned apart from the first visual indicator, such that the second visual indicator can be seen from at least one viewing angle in which the first visual indicator is obscured.

Feature 2: The configuration device of Feature 1, wherein the second visual indicator is positioned on a different side of the configuration device than the first visual indicator.

Feature 3: The configuration device of Feature 1 or 2, wherein the first visual indicator is oriented in a first direction and the second visual indicator is oriented in a second direction different from the first direction.

Feature 4: The configuration device of Feature 1, 2 or 3, wherein the first and second visual indicators are configured to provide at least:
a first indication that the configuration device should be maintained in a position within a predetermined distance of the tyre monitoring device; and
a second indication that the configuration device can be removed to a position beyond the predetermined distance.

Feature 5: The configuration device of Feature 4, wherein the predetermined distance is a maximum range of the wireless communication interface.

Feature 6: The configuration device of Feature 5, wherein the maximum range is less than 30 cm.

Feature 7: The configuration device of any preceding feature, wherein at least one of the first and second visual indicator comprises a display screen.

Feature 8: The configuration device of any preceding Feature, wherein at least one of the first and second visual indicator comprises a light.

Feature 9: The configuration device of any preceding Feature, wherein at least one of the first visual indicator and the second visual indicator comprises an articulated display screen.

Feature 10: A configuration device for a tyre monitoring system comprising:
a wireless communication interface; and
an articulated display screen having at least one degree of freedom such that the articulated display screen can be positioned such that a primary viewing angle of the display screen is adjustable.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A system comprising:
aircraft tire monitoring devices each including a first processor and a first wireless communication device having a maximum transmission range, wherein the aircraft tire monitoring devices are spaced apart by distances greater than the maximum transmission range, wherein the aircraft tire monitoring devices includes a first aircraft tire monitoring device and additional aircraft tire monitoring devices, and
a intermediary device including a second wireless communication interface, a second processor and a memory,
wherein the intermediary device is configured to:
receive, using the second wireless communications interface, data transmitted by the first wireless communications interface of the first aircraft tire monitoring device of the tire monitoring devices;
store the data in the memory of the intermediary device;
be moved to within the maximum transmission ranges of each of the additional aircraft tire monitoring devices;
transmit the data using the second wireless communication interface to each of the additional aircraft tire monitoring devices while the intermediary device is within the maximum transmission range of the each of the other aircraft tire monitoring devices,
determine that the data was transmitted to each of the additional aircraft tire monitoring devices, and
erase the data from the memory after the transmission of the data to each of the additional aircraft tire monitoring devices after the determination that the data was transmitted to each of the additional aircraft tire monitoring devices.

2. The system of claim 1, further comprising a fourth device comprising a third wireless communication interface and a third processor,
wherein the data is configuration information received by the first aircraft tire monitoring device from the fourth device.

3. The system of claim 1, wherein the intermediary device is further configured to:
check for other ones of the additional aircraft tire monitoring devices to which the data has not been transmitted by the intermediary device, and
perform the transmitting of the data to the other ones of the additional tire monitoring devices to which the data had not been previously transmitted.

4. A method of distributing data between a plurality of aircraft tire monitoring devices using an intermediary device, each of the aircraft tire monitoring devices and the intermediary device comprising a wireless communication interface having a maximum transmission range, wherein the plurality of aircraft tire monitoring devices are associated with an aircraft and are spaced apart from each other by greater than the maximum transmission range and the aircraft tire monitoring devices include a first aircraft tire monitoring device and a plurality of additional aircraft tire monitoring devices, the method comprising:
receiving, at the intermediary device, data from the first aircraft tire monitoring device of the aircraft tire monitoring devices using the wireless communication interface of the first aircraft tire monitoring device and the wireless communication interface of the intermediary device;
storing, by the intermediary device, the data in a memory of the intermediary device;
moving the intermediary device to within the maximum transmission range of each of the additional aircraft tire monitoring devices;
transmitting, by the intermediary device, the data to the additional aircraft tire monitoring devices using the wireless communication device of the intermediary device and the wireless communication device of the additional aircraft tire monitoring device;
determining that the data was transmitted to each of the additional aircraft tire monitoring devices by the intermediary device, and
after the determination that that data has been transmitted to each of the additional tire monitoring devices, erasing the data from the memory of the intermediary device.

5. The method of claim 4, wherein the maximum transmission range is less than 30 cm.

6. The method of claim 4, wherein the erasing the data unreadable is responsive to turning off the intermediary third device.

7. The method of claim 4, wherein the erasing the data is responsive to a determination that a predetermined period of time has elapsed since the data was last transmitted to another one of the aircraft tire monitoring devices.

8. The method of claim 4, wherein the data comprises configuration information.

9. The method of claim 8, wherein the configuration information is received by the first aircraft tire monitoring device from a fourth device.

10. The method of claim 9, wherein communications between the first aircraft tire monitoring device and the intermediary device uses a first wireless communication interface and communications between the first aircraft monitoring device and the fourth device use a second wireless communication interface, and
    the second wireless communication interface having a greater maximum range than the first wireless communication interface.

11. The method of claim 9, further comprising:
    providing an indication, by the fourth device, to direct the movement of the intermediary device from the first aircraft tire monitoring device to a different one of the aircraft tire monitoring devices after the transmitting of the configuration data by the first aircraft tire monitoring device.

12. The method of claim 4, wherein the data comprises an encryption key.

13. The method of claim 12, wherein the method comprises:
    generating, by the first aircraft tire monitoring device, the encryption key after receiving configuration data from a fourth device.

14. The method of claim 12, wherein the method comprises:
    generating, by the first aircraft tire monitoring device, the encryption key responsive to a command received from a fourth device.

15. The method of claim 4, further comprising:
    the intermediary device checking for other ones of the additional aircraft tire monitoring devices to which the data was not been transmitted by the intermediary device, and
    perform the transmitting of the data to the other ones of the additional tire monitoring devices to which the data had not been previously transmitted.

\* \* \* \* \*